United States Patent [19]

Tassinario

[11] Patent Number: 4,837,921
[45] Date of Patent: Jun. 13, 1989

[54] PROCESS FOR MANUFACTURING A GROOVELESS STATOR FOR ELECTRIC MOTOR

[75] Inventor: Giampiero Tassinario, Florence, Italy

[73] Assignee: Mavilor Systemes S. A., Switzerland

[21] Appl. No.: 156,174

[22] Filed: Feb. 16, 1988

[30] Foreign Application Priority Data

Oct. 21, 1987 [CH] Switzerland ............... 4116/87

[51] Int. Cl.$^4$ .................................. H02K 15/02
[52] U.S. Cl. .................... 29/596; 264/272.2; 310/43; 310/216
[58] Field of Search ............... 29/596, 598; 310/43, 310/216, 154, 155; 264/272.19, 272.2

[56] References Cited

U.S. PATENT DOCUMENTS

| | | | |
|---|---|---|---|
| 2,354,551 | 7/1944 | Sawyer | 310/216 |
| 2,759,116 | 8/1956 | Glass | 29/598 |
| 3,848,331 | 11/1974 | Pavlik et al. | 29/596 |
| 4,679,313 | 7/1987 | Schultz et al. | 29/596 |

Primary Examiner—Carl E. Hall
Attorney, Agent, or Firm—Kane, Dalsimer, Sullivan, Kurucz, Levy, Eisele and Richard

[57] ABSTRACT

A cylindrical winding is formed, of which the turns of the coils situated at the edges of the cylinder are bent back towards the outside, thus obtaining two external shoulders (2, 3). The winding is introduced into an appropriate mold, and a synthetic resin is injected; after cooling and removal from the mold, a rigid unit (11) is obtained. Around this unit (11) and between the two shoulders (2, 3) there is wound an iron wire (12) which forms the yoke of the stator. The unit thus obtained is then mounted in an aluminum frame by simple mechanical means.

7 Claims, 2 Drawing Sheets

PROCESS FOR MANUFACTURING A GROOVELESS STATOR FOR ELECTRIC MOTOR

FIELD OF THE INVENTION

The present invention relates to a process for manufacturing a grooveless stator for electric motor and to the electric motor comprising a stator manufactured according to the process, and more particularly to a motor of which the rotor is provided with permanent magnets.

PRIOR ART

Usually, the stator and, especially, the yoke of an electric motor of which the rotor is provided with permanent magnets has grooves, inside which there is located a copper winding. In this manner, the magnetic gap of the motor is relatively small, which enables the magnetic permeance to be high. Nevertheless, the flux density is limited by the saturation of the iron at the edges of the teeth defining the grooves. Increasing the width of the teeth enables the flux density to be increased, but this is at the expense of the size of the grooves, and thus of the quantity of copper (the winding). The flux density is thus limited by the necessary compromise between the width of the teeth and the dimensions of the grooves, which must contain as much copper as possible. The appearance of high-energy permanent magnets on the market has enabled grooveless stators to be constructed. The winding, which has a cylindrical shape, is arranged in the magnetic gap, which, of course, is thus larger than that of a motor having a grooved yoke. The radial thickness of the winding is lower than it would be in a grooved yoke for the same quantity of copper, since the winding can occupy all the cylindrical space between the yoke and the rotor. Moreover, the increase in the magnetic gap is compensated by the disappearance of saturation problems at the ends of the teeth, the magnetic flux being constant over the entire extent of the magnetic gap, and it is possible to use magnetic densities greater than those usually used. The elimination of grooved yokes has enabled the Cogging effect (variation in magnetic flux in the gap due to the presence of the grooves) to be eliminated, to decrease the manufacturing costs, to decrease wastage of the material and to simplify the mounting of the yoke and of the winding. According to one of the usual processes, the cylindrical winding is prepared on a cylindrical support, the yoke is prepared, for example, with iron rings surrounded by an aluminum bushing, the winding is introduced into the yoke and a synthetic resin is injected to fasten the winding to the yoke. Frequently, as described elsewhere in the patent U.S. Pat. No. 4,679,313, the winding is mounted on a cylindrical insulating support, for example of glass, which remains in the yoke with the winding, which unnecessarily increases the magnetic gap. According to the construction of the winding, the turns of the coils at the edges of peripheral ends of the winding pose certain problems, for example when the winding is introduced into the yoke; U.S. Pat. No. 4,679,313 provides circular recesses in the inner surface of the yoke to accommodate these and to enable the rotor to be put into position. For the introduction of the winding into the yoke, and before the injection of the resin, there is provided a cylindrical support of which the front end has a conical projection around which the winding turns can be bent when they are introduced into the yoke, before straightening them and accommodating them in the circular recess of the yoke. Should the winding be defective, it is almost impossible to replace it, since the aluminum frame, the yoke and the winding form a single unit, the resin having made the winding integral with the yoke.

The present invention provides a process for manufacturing a grooveless stator which enables the above-mentioned disadvantages to be eliminated and in particular to make the manufacture of a grooveless stator more simple and more economical.

SUMMARY OF THE INVENTION

The advantages of this process are as follows: The winding is used to form a rigid unit, a kind of cartridge, which is able to withstand certain mechanical stresses, in particular the assembly of the yoke directly onto this cartridge. The turns of the coils at the peripheral ends of the winding form shoulders of which, depending on the circumstances, at least one has a precise mechanical function, as will be explained below. If the winding becomes defective, the unit formed from the winding and the yoke can easily be removed from the frame and replaced, the external frame of the motor often being of aluminum provided with cooling fins on its external surface. In the conventional designs, the motor frame is integrally formed with the yoke, and they cannot be separated easily.

The advantages of this variant are as follows: By bending back the turns of the coils towards the outside, two external shoulders are obtained which enable the wire of magnetic material forming the stator yoke to be wound, without the necessity of a mold or another mechanical means to maintain the peripheral edges of the winding formed by the coiling of the wire of magnetic material. The advantage of using the wire to form the yoke is that losses by Foucault currents are avoided. This construction is particularly economical and simple to carry out, since it avoids the previous manufacture of the stator yoke (machining, cutting, connection etc.). The fact that the winding is imbedded in resin as well as the insulating agent surrounding the copper wire used for the winding makes this winding into a rigid support which is suitable for the direct coiling of the wire onto it, and ensures that there is no risk of the yoke coming into inadvertent contact with a coil of the winding, following a weakening of the insulating layer, and of causing short circuits.

To limit the noise of the yoke, and to make it more compact, the unit thus obtained can be coated with a synthetic resin, which at the same time results in a rigid unit.

The advantages of this variant are as follows: The external shoulder of the rigid winding serves as a stop when the rings of magnetic material are mounted, before they are connected by the application of a synthetic resin, the ease of manufacture which makes the construction of the stator economical, the possibility, as seen above, of replacing the unit formed from the winding and the yoke in the case of defects.

BRIEF DESCRLPTION OF THE DRAWINGS

The invention will be described in more detail with the aid of the attached drawing.

DESCRIPTION OF THE PREFERRED EMBODIMENTS

Figure 1:
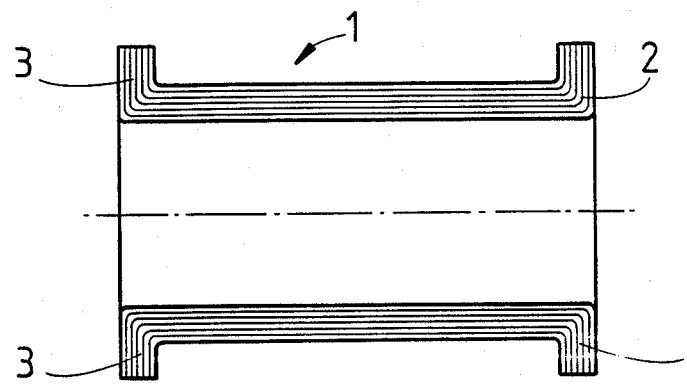
FIG. 1 is a diagrammatic side view of a cylindrical winding.
Figure 2:
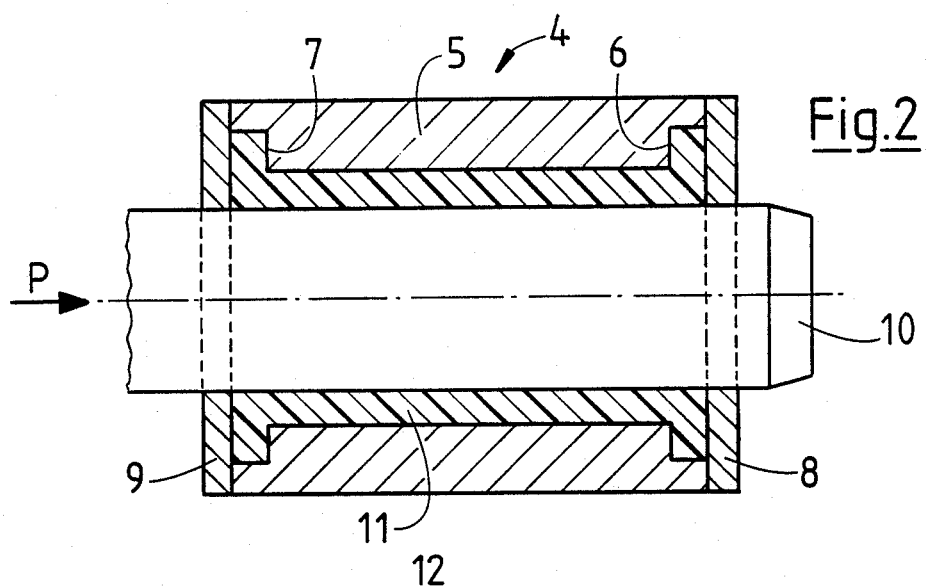
FIG. 2 is a sectional view of the winding of FIG. 1, inside the mold.
Figure 3:
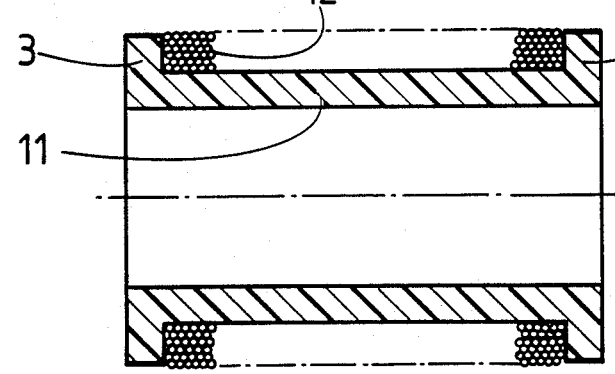
FIG. 3 is a sectional view of the stator obtained after coiling of the wire around the rigid winding.

In FIG. 1, there is shown a cylindrical winding 1 of which the coils extend axially and in which the turns of the coils 2, 3 have been bent back at the edges of the peripheral ends of the winding in planes perpendicular to the axis of the winding containing the circular edges of the winding, and towards the outside, thus forming external shoulders 2, 3. This winding 1 is formed on a cylindrical support (not shown) in conventional manner. The winding is then introduced into a mold 4 comprising a cylindrical part divided into two half-molds provided with shoulders 6, 7 which are respectively conjugate with the shoulders 2, 3 of the winding 1 and two rings 8, 9 closing the mold 4 at each end and allowing a cylindrical piece 10 exerting a pressure P on the winding 1 to be passed through and to push it against the mold 4.

After having put the winding 1 in position in the mold 4, a synthetic resin is injected at a high temperature, the mold is allowed to cool, the piece 10 is withdrawn, and the molding is removed from the press. A rigid unit 11 is thus obtained, formed by the winding 1 and the resin in which the latter is enveloped. Of course, the ends of the conductor for the connections of the windings with control devices (electronic switching, etc.) are left outside the rigid winding 11, to carry out subsequently the connections with the corresponding devices.

Then, a wire 12 of magnetic material, for example iron, is coiled directly around the rigid unit 11 to form the yoke of the stator. The wire 12 is coiled without difficulty, on the one hand because the shoulders 2, 3 of the winding serve as lateral guides, and on the other hand because the mechanical resistance of the unit 11 is sufficient to withstand the yoke thus formed without any other external aid. After having finished the coiling of the wire 12, which is an iron wire which is readily available commercially, of 0.30 mm diameter, for example, the yoke is preferably coated with a resin which makes the yoke integral with the winding and prevents noise. Before being coiled around the winding, the iron wire can be coated with an insulating agent in order to reduce Foucault currents. Nonetheless, tests have shown that, even if the wire is not insulated, the contact between the coils of the wire is made on a small surface, and Foucault currents are negligible.

The value of this stator, apart from the simplicity of the manufacturing process, is the low cost of the constituent elements and the absence of losses by Foucault currents.

The stator thus obtained is then used for mounting a motor, for example by connecting to it a rotor with permanent magnets, and mounting it in a frame, preferably of aluminum. The rigid unit thus obtained is introduced into an aluminum frame provided with cooling fins and having an internal shoulder against which one end of this unit comes to bear, whereas a ring is pushed against the other end, this ring being connected to the shoulder by threaded rods and screws which enable the ring to be driven against the stator.

Figure 4:
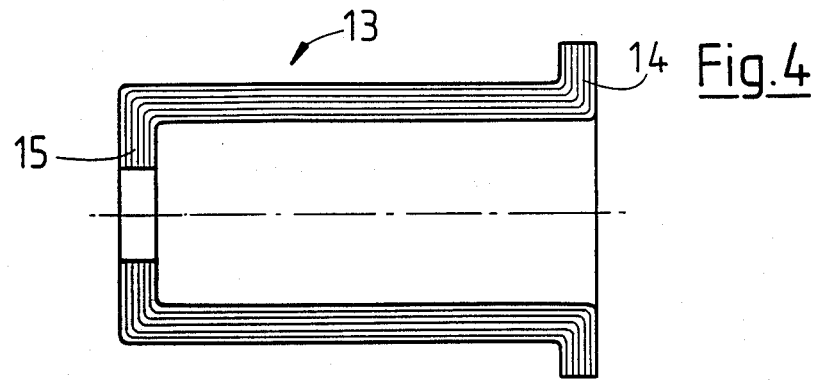
FIG. 4 is a diagrammatic side view of a second winding.
Figure 5:
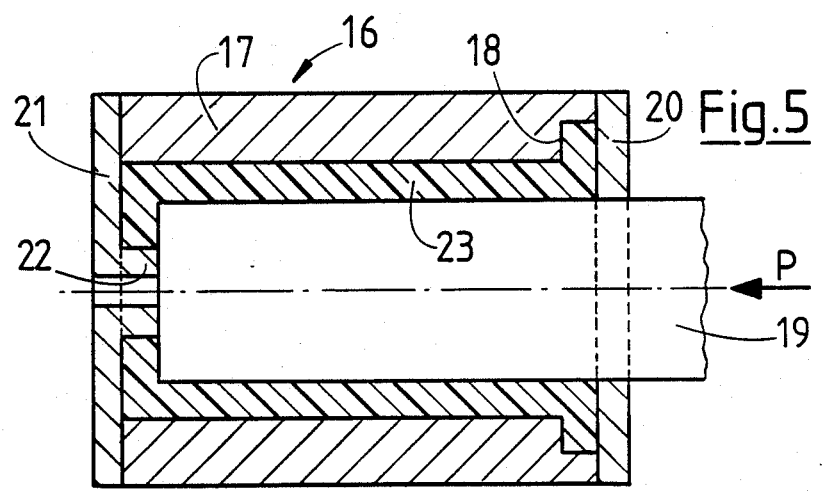
FIG. 5 is a sectional view of the winding of FIG. 4, inside the mold.
Figure 6:
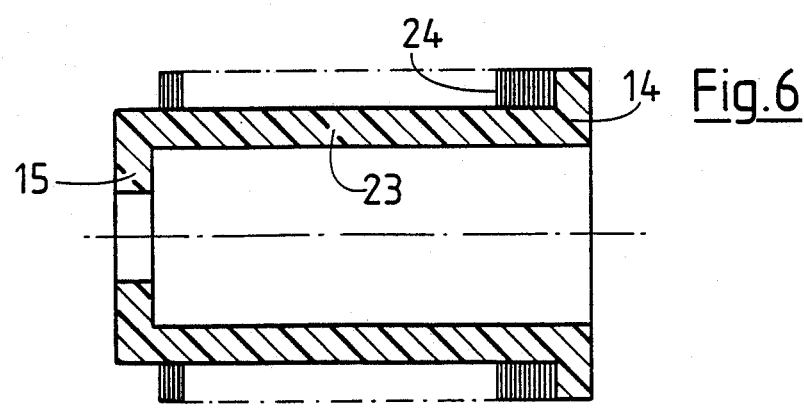
FIG. 6 is a sectional view of the stator obtained after having threaded the rings onto the rigid winding.

In accordance with another variant of the process (FIGS. 4 to 6), the winding 13 is formed as above, except that this time the turns of the coils at the edges of the peripheral ends of the winding are bent back at one of the ends towards the outside, forming an external shoulder 14, whereas at the other end they are bent back towards the inside, forming an internal shoulder 15. After the formation of this winding 13, it is introduced into a mold 16, comprising a cylindrical part 17 formed from two semi-cylindrical half-molds having a shoulder 18 conjugate with the external shoulder 14 of the winding 13, a cylindrical pressure piece 19, a ring 20 closing the mold 16 at the side with the external shoulder and a piece 21 having a cylindrical projection 22 to surround, between it and the pressure piece 19, the internal shoulder 15 of the winding 13. After the winding 13 has been put in position, a resin is injected inside the mold 16 at a high temperature.

After cooling, the pressure piece 19 is withdrawn and the molding is removed from the press, thus obtaining a rigid unit 23 comprising the winding 13 enveloped in the resin. Then, the stator yoke is formed by threading onto the unit 23 on the side with the internal shoulder insulated rings 24 of magnetic material. The shoulder 14 serves as a stop for the limit of travel, and after the yoke has been completed, the rings 24 are connected by applying a synthetic resin. The stator is mounted in the frame as described above.

The value of the stators according to the invention, apart from the simplicity of construction and low cost, is that if the winding is defective the unit formed from the winding imbedded in the resin 11 or 23 respectively and the yoke 12 or 24 respectively can be removed and replaced by another without having to reconstruct the frame.

The stator thus obtained is used for the assembly of a motor having, for example, a rotor with permanent magnets.

I claim:

1. A process for manufacturing a grooveless stator for an electric motor, essentially comprising a cylindrical winding and a yoke of magnetic material surrounding the winding, which process comprises the following steps:

forming a cylindrical winding having an axis and having two peripheral circular ends with edges and coils having turns, bending the turns of the coils at the edges of the two peripheral ends of the winding back radially outwardly, thus forming two external shoulders, introducing the winding into an appropriate mold and injecting a synthetic resin into the mold, cooling the mold, after cooling, removing the mold which step produces a rigid winding having a cylindrical surface and two external shoulders extending radially therefrom, coiling a wire of magnetic material around the cylindrical surface of the rigid winding and between said shoulders such that the winding partly or completely fills the space between the two shoulders to thereby mount and secure the yoke of magnetic material around the winding, and fastening a unit thus obtained in a frame of the motor.

2. A process as claimed in claim 1, wherein the unit thus obtained is coated with a synthetic resin.

3. A process as claimed in claim 1, wherein the wire of magnetic material is coated with an insulating agent before coiling it around the winding.

4. A process for manufacturing a grooveless stator for an electric motor, essentially comprising a cylindrical winding and a yoke of magnetic material surrounding the winding, which process comprises the following steps:

5. A process as claimed in claim 4, wherein the unit thus obtained is coated with a synthetic resin.

6. A process as claimed in claim 4, wherein the wire of magnetic material is coated with an insulating agent before coiling it around the winding.

7. A process for manufacturing a grooveless stator for an electric motor, essentially comprising a cylindrical winding and a yoke of magnetic material surrounding the winding, which process comprises the following steps:

forming a cylindrical winding having an axis and having two peripheral circular ends with edges and coils having turns, bending the turns of the coils at one of the two edges of the peripheral ends of the winding radially outwardly thereby forming an external shoulder, and bending the turns of the coils at the other edge of the winding radially inwardly thereby forming an internal shoulder, introducing the winding with the formed shoulders into an appropriate mold and injecting a synthetic resin into the mold, cooling the mold, after cooling, removing the mold, which produces a rigid winding having a cylindrical surface, a radially outwardly extending shoulder and a radially inwardly extending shoulder, threading rings of magnetic material of which the internal diameter is approximately equal to the diameter of the cylindrical surface of the winding onto the winding at the end with the internal shoulder until a yoke of the desired length is obtained and mounted against said external shoulder, connecting the rings to one another and to the winding by embedding them in synthetic resin and fastening a unit thus obtained in a frame of the motor.

* * * * *

UNITED STATES PATENT AND TRADEMARK OFFICE
CERTIFICATE OF CORRECTION

PATENT NO. : 4,837,921

DATED : June 13, 1989

INVENTOR(S) : Giampiero Tassinario

It is certified that error appears in the above-identified patent and that said Letters Patent is hereby corrected as shown below:

Claim 4, column 5, after line 5, insert --forming a cylindrical winding having an axis and having two peripheral circular ends with edges and coils having turns, bending the turns of the coils at one of the two edges of the peripheral ends of the winding radially outwardly thereby forming an external shoulder, and bending the turns of the coils at the other edge of the winding radially inwardly thereby forming an internal shoulder, introducing the winding with the formed shoulders into an appropriate mold and injecting a synthetic resin into the mold, cooling the mold, after cooling, removing the mold, which produces a rigid winding having a cylindrical surface, a radially outwardly extending shoulder and a radially inwardly extending shoulder, coiling around the cylindrical surface of the rigid winding a wire of magnetic material to form and mount the yoke around the winding and fastening a unit thus obtained in a frame of the motor.--

Signed and Sealed this

Sixth Day of October, 1992

*Attest:*

DOUGLAS B. COMER

*Attesting Officer*  *Acting Commissioner of Patents and Trademarks*